United States Patent [19]
Tsai

[11] Patent Number: 5,669,268
[45] Date of Patent: Sep. 23, 1997

[54] BRAKE LEVER MECHANISM

[75] Inventor: Shih Fan Tsai, Chang Hua Hsien, Taiwan

[73] Assignee: Tektro Technology Corporation, Chang Hua Hsien, Taiwan

[21] Appl. No.: 659,153

[22] Filed: Jun. 5, 1996

[51] Int. Cl.[6] .................... B62K 23/06; B62L 3/02
[52] U.S. Cl. .................. 74/489; 74/502.2; 74/502.6; 74/522
[58] Field of Search .............. 74/489, 522, 502.2, 74/502.6

[56] References Cited

U.S. PATENT DOCUMENTS 5,279,179  1/1994  Yoshigai .................. 74/489 X
5,448,927  9/1995  Lumpkin .................. 74/502.2
5,515,743  5/1996  Lumpkin .................. 74/489 X
5,537,891  7/1996  Nagano et al. ............. 74/525

*Primary Examiner*—Allan D. Herrmann

[57] ABSTRACT

A brake lever mechanism including a bracket having a shaft disposed in the middle portion. A brake handle has a grip and an arm joined at their proximal ends. The arm includes a lower portion engaged with the shaft and includes a groove and two recesses. One of the recesses is located closer to the shaft than the other recess such that the recess may move for a farther distance than the other recess relative to the shaft when the arm is rotated about the shaft, and such that the leverage of the brake lever can be adjusted.

3 Claims, 3 Drawing Sheets

5,669,268

BRAKE LEVER MECHANISM

BACKGROUND OF THE INVENTION

1. Field of the Invention

The present invention relates to a brake lever, and more particularly to a brake lever mechanism that may be changed to different leverage.

2. Description of the Prior Art

Typical brake levers are designed for braking purposes. However, the leverage of the brake lever may not be changed. In order to allow leverage adjustment, U.S. Pat. No. 5,448,927 to Lumpkin discloses a brake lever having an adjustable bolt for adjusting the leverage of the brake lever. However, normally, only two leverages are required for the brake levers. In addition, the cable link may not be stably retained in place by the bolt. Furthermore, the brake lever includes a complicated configuration that is adverse for manufacturing purposes.

The present invention has arisen to mitigate and/or obviate the afore-described disadvantages of the conventional brake levers.

SUMMARY OF THE INVENTION

The primary objective of the present invention is to provide a brake lever mechanism including a greatly simplified configuration for allowing leverage adjustment.

In accordance with one aspect of the invention, there is provided a brake lever comprising a bracket including a middle portion having a pivot shaft provided therein, a brake handle including an elongated finger grip and a transverse elongated mounting arm joined at their proximal ends and integrally formed, the arm including a lower portion engaged with the pivot shaft so as to allow the arm to be rotated about the pivot shaft, the arm including a groove formed therein and including a first and a second recesses formed therein and communicating with the groove, the second recess being located between the pivot shaft and the first recess and located closer to the pivot shaft than the second recess, such that the first recess moves for a farther distance than the second recess relative to the pivot shaft when the arm is rotated about the pivot shaft, a coupler including a rod secured thereto and slidably engaged in the groove for engaging with the first and the second recesses, and means for retaining the rod in the first and the second recesses.

The coupler includes a pair of panels for engaging with the arm, the rod is secured between the panels and slidably engaged in the groove for engaging with the first and the second recesses.

The arm includes a screw hole formed therein and aligned with the groove, the retaining means includes a bolt for engaging with the screw hole of the arm and for threading into the groove so as to engage with and to retain the rod in the first and the second recesses.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
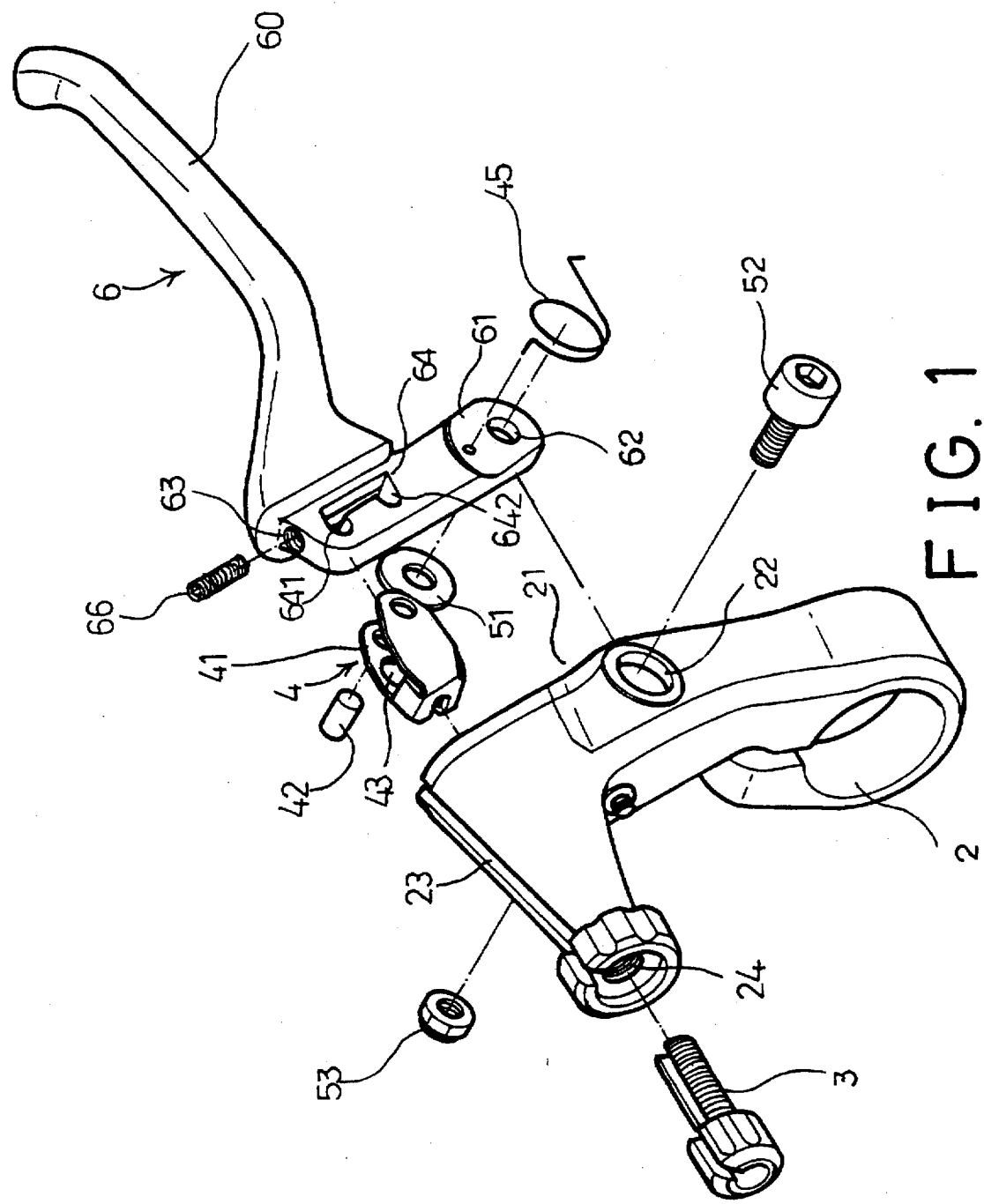
FIG. 1 is an exploded view of a brake lever in accordance with the present invention.
Figures 2, 3:
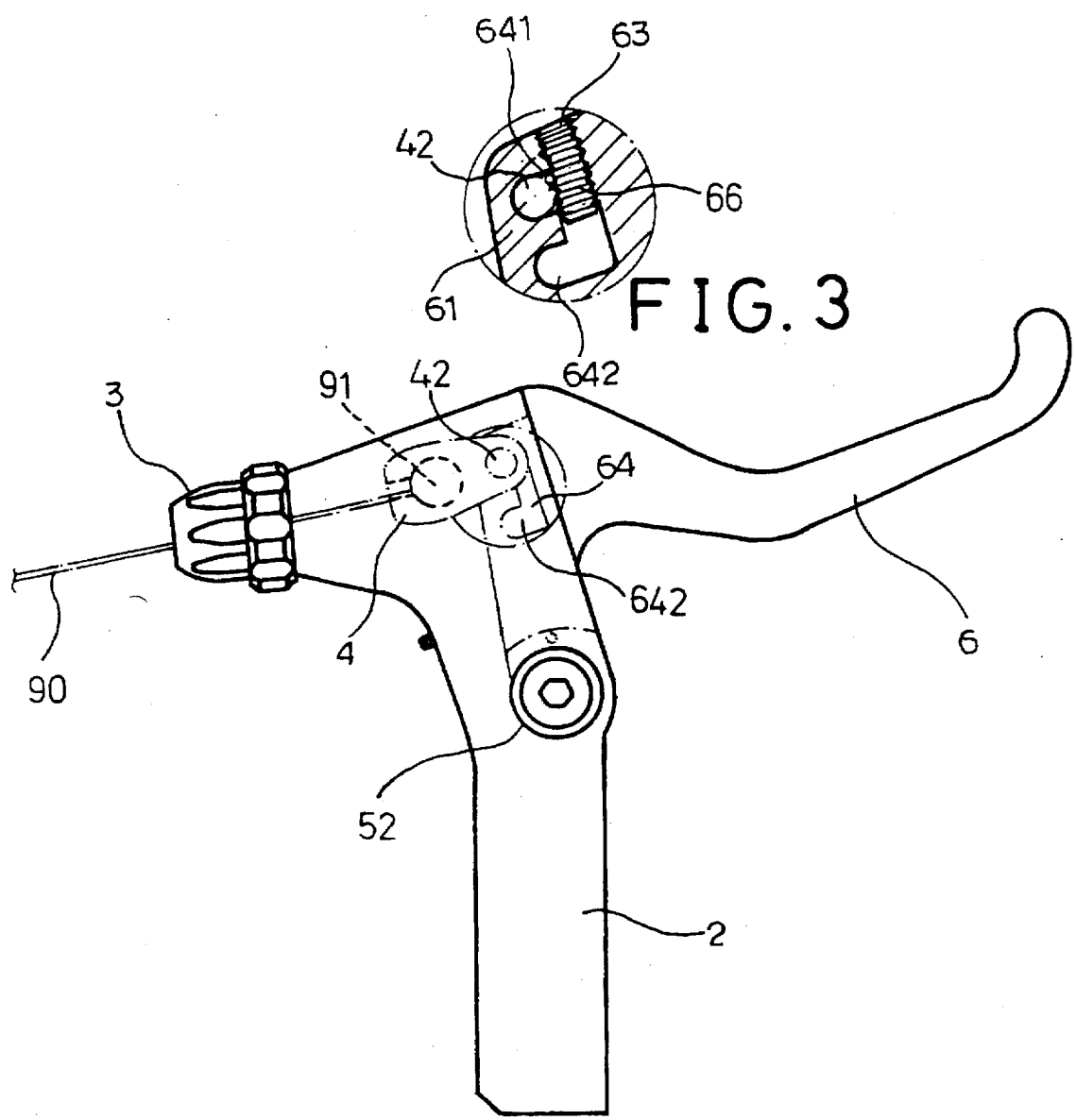
FIG. 2 is a plane view of the brake lever.
FIG. 3 is an enlarged partial cross sectional view, illustrating the engagement of the retaining bolt with the pin.

Referring to the drawings, and initially to FIGS. 1 to 3, a brake lever mechanism in accordance with the present invention comprises a bracket 2 including an opening 21 formed therein and including a hole 22 formed in the middle portion for engaging with a pivot shaft or a bolt 52 which is engaged with a nut 53. The bracket 2 includes a slot 23 for engaging with the brake cable 90 (FIGS. 2–5) and includes a screw hole 24 for engaging with a bolt 3 which may retain the brake cable 90 in place.

A brake handle 6 includes an elongated finger grip 60 and a transverse elongated mounting arm 61 joined at their proximal ends and integrally formed. The arm 61 includes a lower portion engaged in the opening 21 of the bracket 2 and includes a hole 62 for engaging with the pivot bolt 52 such that the arm 61 may be rotated about the bolt 52. A washer 51 is engaged on the bolt 52 and engaged between the arm 61 and the bracket 2. The arm 61 includes a groove 64 formed therein and includes two recesses 641, 642 formed therein and communicating with the groove 64. The recess 642 is located between the pivot bolt 52 and the recess 641 such that the distance between the recess 641 and the bolt 52 is greater than that between the other recess 642 and the bolt 52. A spring 45 is engaged on the bolt 52 and engaged with the arm 61 and the bracket 2 for biasing the arm 61 to engage with the bracket 2.

Figure 5:
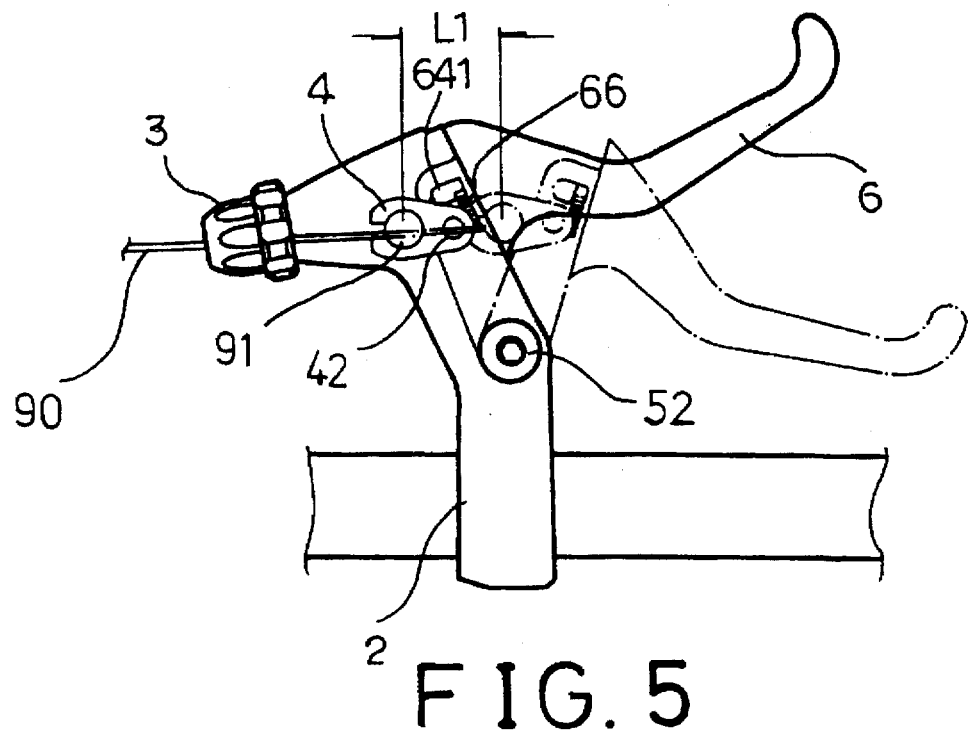
FIGS. 4 and 5 are plane views illustrating the operation of the brake lever.
Figure 4:
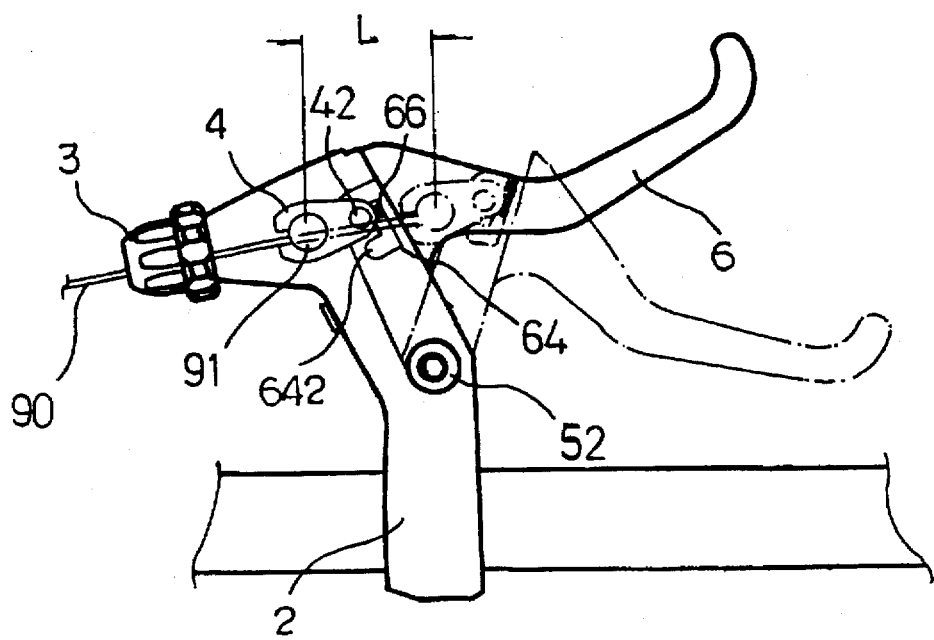

A coupler 4 includes a pair of panels 41 for engaging with the arm 61 and includes a rod 42 secured between the panels 41 and slidably engaged in the groove 64. The rod 42 may be engaged in either of the recesses 641, 642 (FIGS. 3–5). The coupler 4 includes an orifice 43 formed therein for engaging with a cast lug barrel 91 of the brake cable 90. The arm 61 includes a screw hole 63 formed therein and aligned with the groove 64 for engaging with a retaining bolt 66. The retaining bolt 66 may be threaded into the groove 64 for retaining the rod 42 in either of the recesses 641, 642 (FIGS. 3–5).

In operation, when the rod 42 is engaged in the recess 641 (FIGS. 3 and 4), the barrel 91 may be moved for a longer distance L. However, when the rod 42 is engaged in the other recess 642 (FIG. 51, the barrel 91 may be moved for a shorter distance L1 such that the leverage of the brake lever can be adjusted or changed.

Accordingly, the brake lever mechanism includes a brake handle having two recesses for engaging with the rod of a coupler and for adjusting the distance between the rod and the pivot bolt such that the leverage of the brake handle can be adjusted.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake lever mechanism comprising:

a bracket including a middle portion having a pivot shaft provided therein, a brake handle including an elongated finger grip and a transverse elongated mounting arm joined at their proximal ends and integrally formed, said arm including a lower portion engaged with said pivot shaft so as to allow said arm to be rotated about said pivot shaft, said arm including a groove formed therein and including a first and a second recesses formed therein and communicating with said groove, said second recess being located between said pivot shaft and said first recess and located closer to said pivot shaft than said second recess, such that said first recess moves for a farther distance than said second recess relative to said pivot shaft when said arm is rotated about said pivot shaft, a coupler including a rod secured thereto and slidably engaged in said groove for engaging with said first and said second recesses, and means for retaining said rod in said first and said second recesses.

2. A brake lever mechanism according to claim 1, wherein said coupler includes a pair of panels for engaging with said arm, said rod is secured between said panels and slidably engaged in said groove for engaging with said first and said second recesses.

3. A brake lever mechanism according to claim 1, wherein said arm includes a screw hole formed therein and aligned with said groove, said retaining means includes a bolt for engaging with said screw hole of said arm and for threading into said groove so as to engage with and to retain said rod in said first and said second recesses.

* * * * *